United States Patent
Vajravel

(10) Patent No.: US 10,313,448 B2
(45) Date of Patent: Jun. 4, 2019

(54) EMPLOYING AN AUXILIARY DEVICE TO IMPLEMENT USB DEVICE REDIRECTION

(71) Applicant: Wyse Technology L.L.C., Santa Clara, CA (US)

(72) Inventor: Gokul Thiruchengode Vajravel, Bangalore (IN)

(73) Assignee: WYSE TECHNOLOGY L.L.C., Santa Clara, CA (US)

( * ) Notice: Subject to any disclaimer, the term of this patent is extended or adjusted under 35 U.S.C. 154(b) by 324 days.

(21) Appl. No.: 15/137,139

(22) Filed: Apr. 25, 2016

(65) Prior Publication Data

US 2017/0310790 A1    Oct. 26, 2017

(51) Int. Cl.
*H04L 29/08* (2006.01)
*G06F 9/451* (2018.01)
*G06F 9/4401* (2018.01)
*G06F 13/38* (2006.01)

(52) U.S. Cl.
CPC .......... *H04L 67/141* (2013.01); *G06F 9/4411* (2013.01); *G06F 9/452* (2018.02); *G06F 13/38* (2013.01); *H04L 67/08* (2013.01); *H04L 67/2814* (2013.01); *G06F 2213/0042* (2013.01)

(58) Field of Classification Search
CPC .... H04L 67/42; H04L 67/141; H04L 61/2007
USPC .......................................... 709/203–206, 217
See application file for complete search history.

(56) References Cited

U.S. PATENT DOCUMENTS

| | | | | |
|---|---|---|---|---|
| 8,365,168 B1* | 1/2013 | Kodorkin | ............ | G06F 9/45558 718/1 |
| 2009/0150550 A1* | 6/2009 | Barreto | ............. | H04L 29/08846 709/228 |
| 2010/0070634 A1* | 3/2010 | Ranjan | ................ | H04L 63/0869 709/228 |
| 2012/0158822 A1* | 6/2012 | Dai | ........................... | G06F 9/54 709/203 |
| 2015/0244766 A1* | 8/2015 | Kaushik | ................ | H04L 63/105 709/219 |
| 2016/0099948 A1* | 4/2016 | Ott | ........................ | G06F 9/4445 726/1 |

* cited by examiner

*Primary Examiner* — Cheikh T Ndiaye
*Assistant Examiner* — Melaku Y Habtemariam
(74) *Attorney, Agent, or Firm* — Kirton McConkie; Brian Tucker

(57) ABSTRACT

An auxiliary device can be employed to implement USB device redirection. By employing an auxiliary device, a USB device may be redirected to a server for use by a client terminal within a remote session even if the client terminal alone is not capable of redirecting the USB device. The remoting components tasked with establishing remote sessions can include a client-side or server-side session notifier. This session notifier can be configured to notify a proxy on the auxiliary device when the client terminal establishes a remote session with the server. In response to this notification, the proxy on the auxiliary device can commence redirecting an appropriate USB device to the server. Then, when the remote session is terminated, the session notifier can notify the proxy to allow the proxy to cease redirecting the USB device.

20 Claims, 12 Drawing Sheets

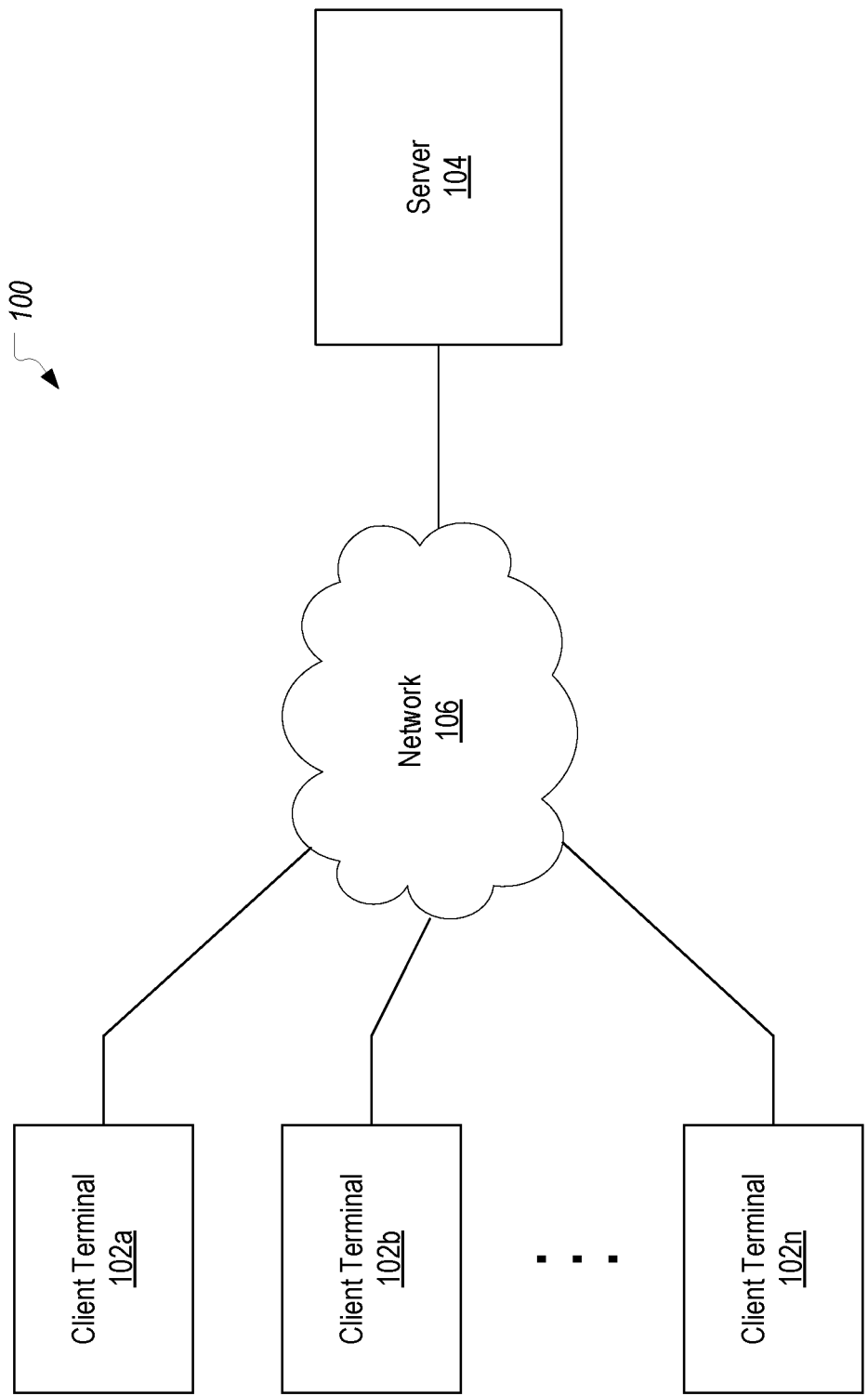

600

601

Receive, At A Proxy Of The Auxiliary Device, A First Notification That Includes Information About A First Remote Session That Has Been Established Between A First Client Terminal And A Server

602

Process The Information In The First Notification To Identify A USB Device To Be Redirected To The Server For Access Within The First Remote Session, The USB Device Being Coupled To The Auxiliary Device

603

Commence The Redirection Of The USB Device To The Server To Allow The Client Terminal To Access The USB Device From Within The First Remote Session

*FIG. 6*

EMPLOYING AN AUXILIARY DEVICE TO IMPLEMENT USB DEVICE REDIRECTION

CROSS-REFERENCE TO RELATED APPLICATIONS

N/A

BACKGROUND

The present invention is generally directed to USB device redirection in a virtual desktop infrastructure (VDI) environment. USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server.

FIGS. 1, 2A and 2B and the following description will provide a general overview of how USB device redirection is typically implemented. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP), the Citrix® Independent Computing Architecture (ICA), PC-over-IP (PCoIP), etc.

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client side, the desktop running on server 104 may represent a virtual desktop environment.

FIG. 2A is a block diagram of a local device virtualization system 200 which can be employed to redirect a USB device. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2A. Server 104 may include an agent 250 and a virtual bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102).

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a user session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106. Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a user session through which client 102 is connected to server 104, such as a session number or a session locally unique identifier (LUID). Agent 250 can provide notification of device 240, along with the device information, to virtual bus driver 260. Virtual bus driver 260 (which may be a TCX USB bus driver, or any other bus driver) may be configured to create and store in memory a record corresponding to device 240, the record including at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281*a*, 281*b*, . . . , 281*n*, referred to generally as device object(s) 281), as illustratively shown in FIG. 2A. A device object 281 is a software implementation of a real device 240 or a virtualized (or conceptual) device 290. Different device objects 281 layer over each other to provide the complete functionality. The different device objects 281 are associated with different device drivers (driver(s) 282*a*, 282*b*, . . . 282*n*, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281*a* stating that a new device has been plugged in. Next, a plug-and-play (PNP) component of the operating system will search for and load the best driver for device 240, which will create another device object 281*b* that is layered over the previous device object 281*a*. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a user session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

Depending on the configuration of the server-side components, a redirected USB device can be made available in any number of remote sessions. For example, the server-side components could be configured to limit access to the redirected device to only the remote session over which it is redirected. Alternatively, the server-side components could be configured to allow the redirected USB device to be accessed from any remote session. For example, FIG. 2B represents the case where a USB device 240a connected to client terminal 102a and a USB device 240b connected to client terminal 102b are made available for access from within the remote sessions established by all of client terminals 102a-102n with server 104. In other words, USB devices 240a and 240b will be viewed as virtual devices 290a and 290b on server 104 and can therefore be accessible from any remote session with server 104 (e.g., as if they were locally connected devices 240a' and 240b').

As can be seen, for USB device redirection to be implemented, client 102 must include bus driver 230, stub driver 220, and proxy 210 (or similar components) that are configured to redirect the device. However, many types of devices that are able to establish remote sessions may be incapable of performing USB redirection for a number of different reasons. For example, a zero client may not have a local operating system or suitable firmware APIs for which client-side redirection components can be configured. Similarly, some thin clients have very minimal local storage or a limited operating system which cannot support client-side redirection components. Other thin clients may have the necessary resources for implementing USB redirection, but may be designed to limit the amount or type of customizations that can be made to their operating systems and/or firmware such that USB redirection cannot be implemented or can only be implemented in an unsatisfactory manner. Further devices may not include USB ports for local connection of USB devices, may have minimal ports that are already occupied (e.g., by a keyboard and mouse), or may have ports that cannot support some USB devices (e.g., a passive port that cannot provide power to the USB device). Regardless of the reason, many devices, particularly thin or zero client devices, cannot currently be employed to redirect a USB device to the server for use within a remote session.

BRIEF SUMMARY

The present invention extends to methods, systems, and computer program products for employing an auxiliary device to implement USB device redirection. By employing an auxiliary device, a USB device may be redirected to a server for use by a client terminal within a remote session even if the client terminal alone is not capable of redirecting the USB device. The remoting components tasked with establishing remote sessions can include a client-side or server-side session notifier. This session notifier can be configured to notify a proxy on the auxiliary device when the client terminal establishes a remote session with the server. In response to this notification, the proxy on the auxiliary device can commence redirecting an appropriate USB device to the server. Then, when the remote session is terminated, the session notifier can notify the proxy to allow the proxy to cease redirecting the USB device.

In some embodiments, the present invention is implemented as a method, performed in a VDI environment, for employing an auxiliary device to implement USB device redirection. A proxy of the auxiliary device receives a first notification that includes information about a first remote session that has been established between a first client terminal and a server. The proxy processes the information in the first notification to identify a USB device to be redirected to the server for access within the first remote session. The USB device is coupled to the auxiliary device. The proxy then commences the redirection of the USB device to the server to allow the client terminal to access the USB device from within the first remote session.

In another embodiment, the present invention is implemented as a VDI environment that includes: a server; a client terminal that is configured to establish remote sessions with the server; and an auxiliary device to which one or more USB devices are connected and that is configured to redirect the one or more USB devices to the server for access by the client terminal from within a remote session established with the server.

In another embodiment, the present invention is implemented as computer storage media storing computer executable instructions which when executed in a VDI environment perform a method for employing an auxiliary device to implement USB device redirection. A session notifier executing on either a server or a client terminal detects that a remote session has been established between the server and the client terminal. The session notifier obtains information about the remote session and sends a notification to a proxy on the auxiliary device that includes the information about the remote session. The proxy processes the information included in the notification to identify one or more USB devices that are to be redirected to the server for access within the remote session. The proxy then employs the information included in the notification to commence redirecting the one or more USB devices to the server.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 1 illustrates an example computing environment in which the present invention can be implemented;

FIG. 6 illustrates a flowchart of an example method for employing an auxiliary device to implement USB device redirection.

DETAILED DESCRIPTION

In this specification, the term USB device will be used to generally refer to any redirected USB device or interface. Some device virtualization systems allow individual interfaces of a composite device to be redirected. In such cases, the interface may largely be treated as if it were a simple device. A client terminal will refer to the device employed by a user to establish a remote session with a server. Therefore, although the present invention is particularly useful when the client terminal is a thin or zero client having limited or no USB device redirection capabilities, any client terminal, including a typical personal computer or laptop, may be employed in embodiments of the present invention.

In accordance with embodiments of the present invention, an auxiliary device can be employed to implement USB device redirection. As indicated in the Background, there may be a variety of reasons why an auxiliary device would be employed to implement USB device redirection including because the client terminal is incapable of or inefficient at redirecting a USB device. By way of example only, the present invention will be generally described with reference to client terminals 302, 402 which do not include a USB port to which the USB device can be connected (whether because the client terminals do not include USB ports or do not have any available USB ports).

Figure 2A:
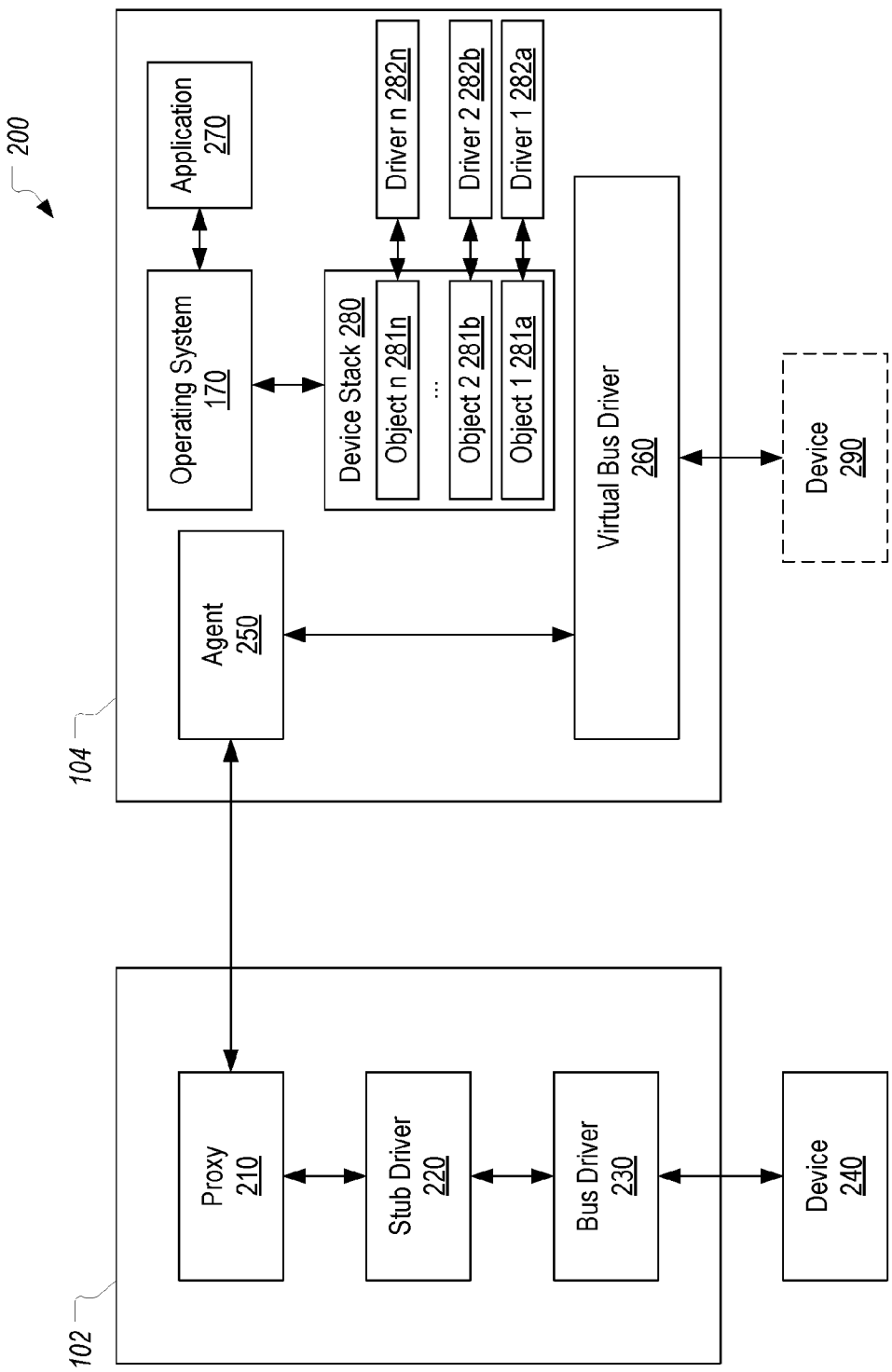
FIG. 2A illustrates how a USB device can be redirected from a client terminal to a server.
Figure 2B:
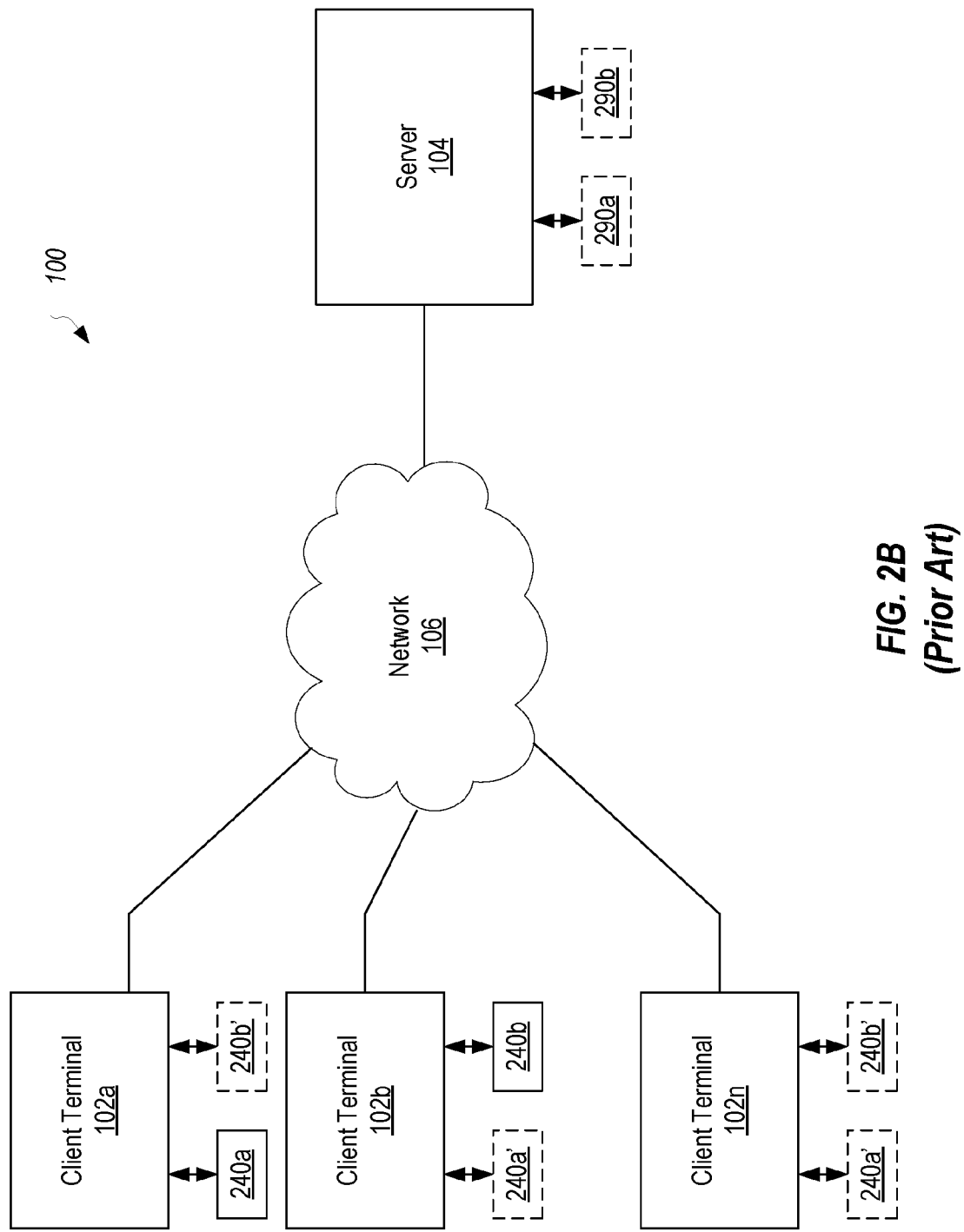
FIG. 2B illustrates how redirecting the USB device to the server can make the device accessible to any remote session established with the server.
Figure 3:
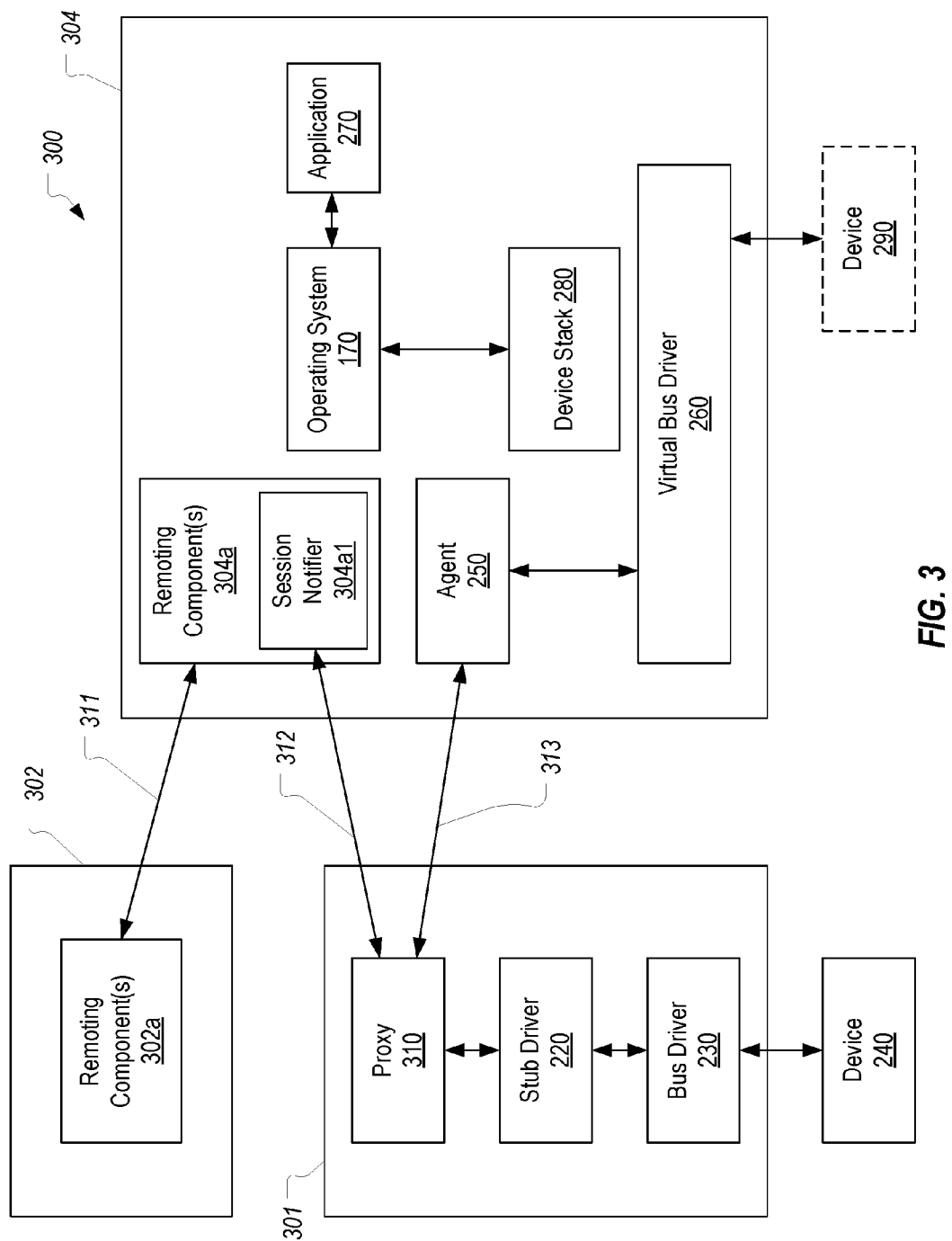
FIG. 3 illustrates an example where a server-side session notifier is employed to notify the auxiliary device when a client terminal creates and terminates a remote session.

FIG. 3 depicts a VDI environment 300 in which a client terminal 302 establishes a remote session 311 with a server 304. As shown, client terminal 302 includes remoting component(s) 302a that are configured to establish remote session 311 with corresponding remoting component(s) 304a on server 304. Remoting components 302a, 304a can represent any suitable components that employ any suitable protocol for establishing remote sessions. For example, remoting components 302a, 304a can be configured to establish remote sessions using RDP, ICA, PCoIP, or any other remoting protocol.

As indicated above, it will be assumed for illustrative purposes only that client terminal 302 does not include a USB port to which USB device 240 can be connected. Therefore, if the user of client terminal 302 desired to access USB device 240 from within remote session 311, it would not be possible to do so using prior art remoting techniques. However, in accordance with embodiments of the present invention, the user could instead connect USB device 240 to auxiliary device 301 to allow auxiliary device 301 to redirect USB device 240 to server 304. The redirected USB device 240 would therefore be available on server 304 as virtual device 290.

It is important to note that the redirection of USB device 240 occurs in conjunction with the establishment of remote session 311. In other words, in response to client terminal 302 establishing remote session 311 with server 304, auxiliary device 301 can redirect USB device 240 so that the redirected device will be made available as if it were redirected over remote session 311.

This redirection of USB device 240 in conjunction with the establishment of remote session 311 is made possible by session notifier 304a1. Session notifier 304a1 can be included as part of remoting component(s) 304a and can be configured to detect when remote session 311 (or any other remote session with another client terminal) is established. As its name indicates, session notifier 304a1 is tasked with notifying proxy 310 on auxiliary device 301 when remote session 311 is established (which is represented by arrow 312). As will be further described below, this notifying can include providing various details about remote session 311.

When it is notified of the establishment of remote session 311, proxy 310 can commence redirecting USB device 240 to server 304 via agent 250 (which is represented by arrow 313). Proxy 310 can redirect USB device 240 in any suitable manner including by establishing a remote session with server 304 and employing a virtual channel of the remote session to redirect USB device 240 to agent 250, by employing a socket to redirect USB device 240 to agent 250, etc. Because USB device 240 is not redirected via remote session 311, proxy 310 can provide details of remote session 311 when redirecting USB device 240 so that agent 250 can handle the redirected USB device in an appropriate manner (e.g., by making the USB device accessible only within remote session 311 or by applying any other type of limitation on access to the redirected USB device).

Figure 3A:
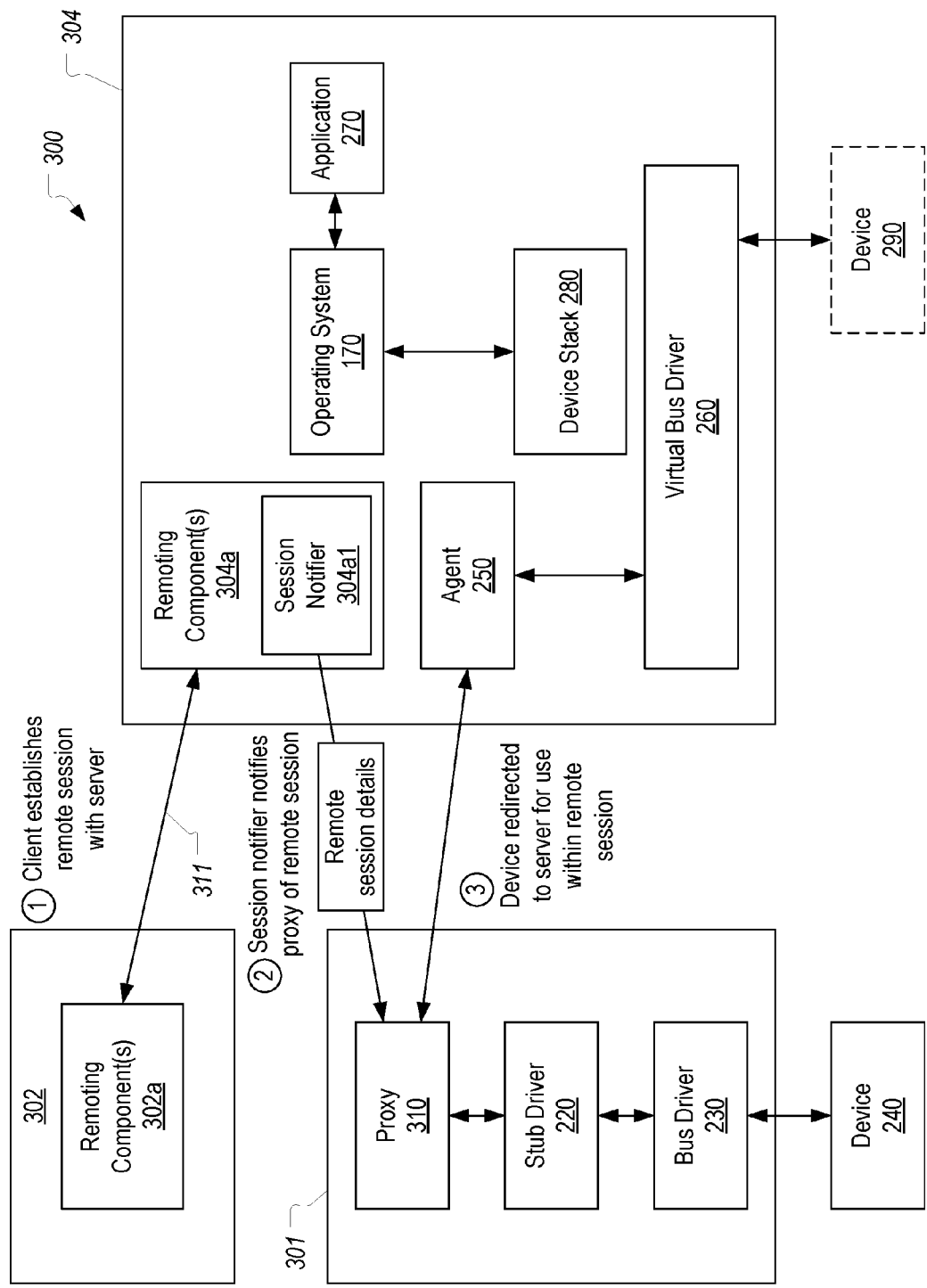
FIGS. 3A and 3B depict an example process by which the server-side session notifier causes the auxiliary device to redirect a USB device and to cease redirecting the USB device respectively.
Figure 3B:
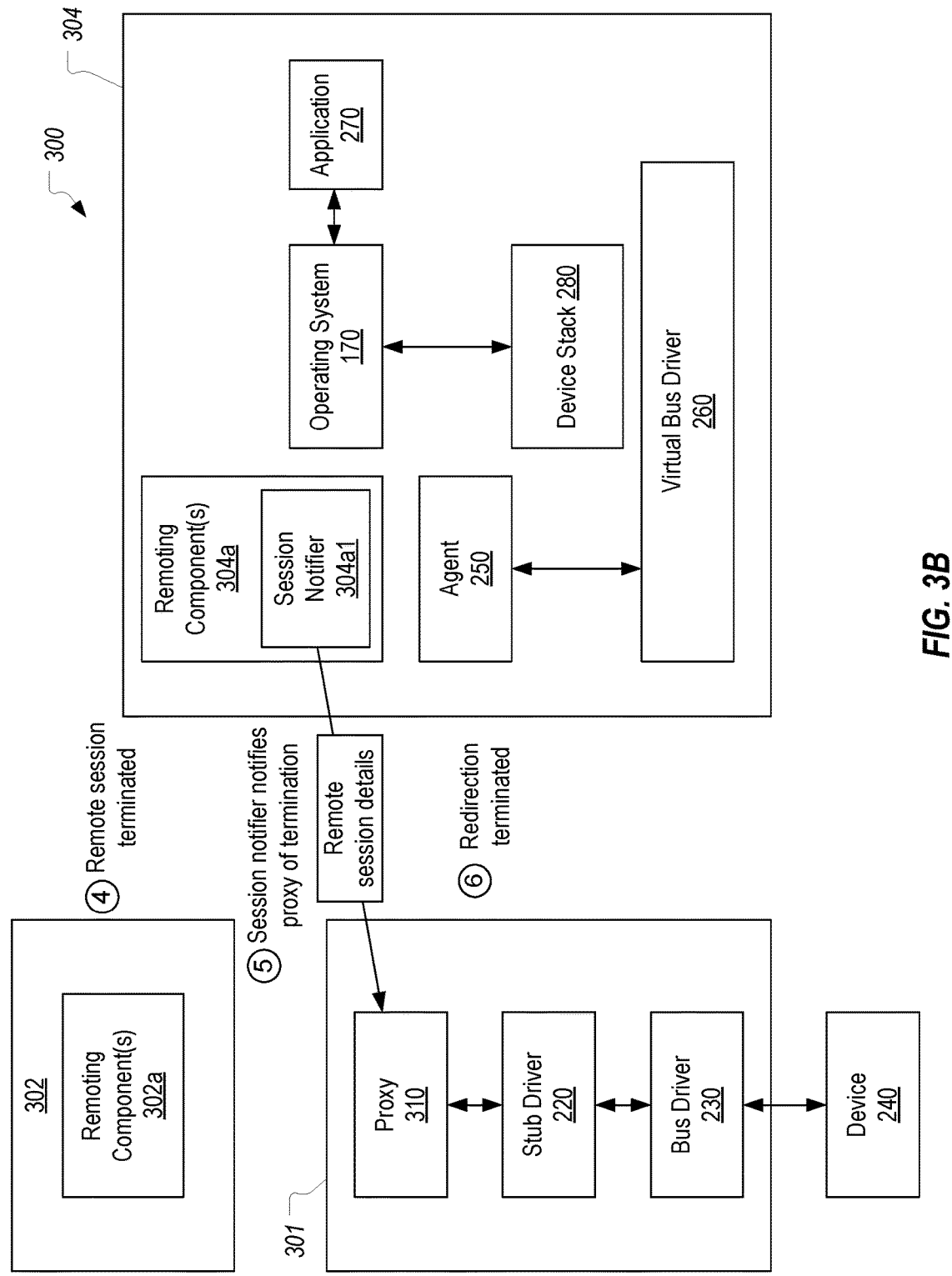

FIGS. 3A and 3B generally represent this process when server-side session notifier 304a1 is employed to notify proxy 310. As shown in step 1 in FIG. 3A, remoting component(s) 302a on client terminal 302 and remoting component(s) 304a on server 304 interact to create remote session 311. As part of establishing remote session 311, session notifier 304a1 can obtain details of remote session 311 including, for example, an IP address of client terminal 302, a protocol employed for remote session 311, an IP address of a remote gateway employed between client terminal 302 and server 304, an IP address of server 304, a session identifier of remote session 311, etc. Upon detecting the establishment of remote session 311, session notifier 304a1 can notify proxy 310 of remote session 311 including providing any pertinent details of the remote session as will be further described below.

It is noted that, to allow session notifier 304a1 to communicate properly with proxy 310 on auxiliary device 301, client terminal 302 may be registered with remoting component(s) 304a and/or session notifier 304a1 to employ auxiliary device 301 for USB device redirection. In other words, session notifier 304a1 can have prior knowledge of where to send notifications of the establishment of remote sessions by client terminal 302. Alternatively, as part of establishing a remote session, remoting component(s) 302a can be configured to provide an indication of which auxiliary device to notify. In any case, session notifier 304a1 can obtain information to allow it to communicate with the appropriate auxiliary device including, for example, an IP address/port number on which the corresponding proxy 310 is listening for notifications. To better emphasize this point, it is further noted that, in accordance with embodiments of the present invention, a number of different auxiliary devices may be configured to redirect USB devices to server 304. Therefore, session notifier 304a1 can be configured to obtain the necessary information to allow it to send notifications to the proper auxiliary device.

Upon receiving a notification from session notifier 304a1, proxy 310 can determine which USB device to redirect and possibly where to redirect the USB device. In FIG. 3A, for simplicity, it is assumed that auxiliary device 301 will only ever redirect USB device 240 to server 304. However, this need not be the case. In some embodiments, client terminal 302 can be configured to establish a remote session with more than one server. In such cases, the notification sent to proxy 310 can include sufficient information to allow proxy 310 to redirect USB device 240 to the appropriate server (e.g., an IP address of the server). Once it is known which USB device(s) is to be redirected and where, proxy 310 can commence the redirection as represented in step 3 of FIG. 3A. Accordingly, USB device 240 can be represented as virtual device 290 on server 304 so that it can be accessed from within remote session 311 and possibly other remote sessions depending on the configuration and/or any applicable policy.

Once remote session 311 is terminated, as indicated by step 4 in FIG. 3B, session notifier 304a1 can detect the termination and notify proxy 310 accordingly in step 5. This notification may again include details of remote session 311 to allow proxy 310 to identify the appropriate action to take. In this example, and as represented by step 6, in response to receiving the notification that remote session 311 has been terminated, proxy 310 can terminate the redirection of USB device 240. Therefore, virtual device 290 will no longer be accessible on server 304 from within any remote session.

Figure 4:
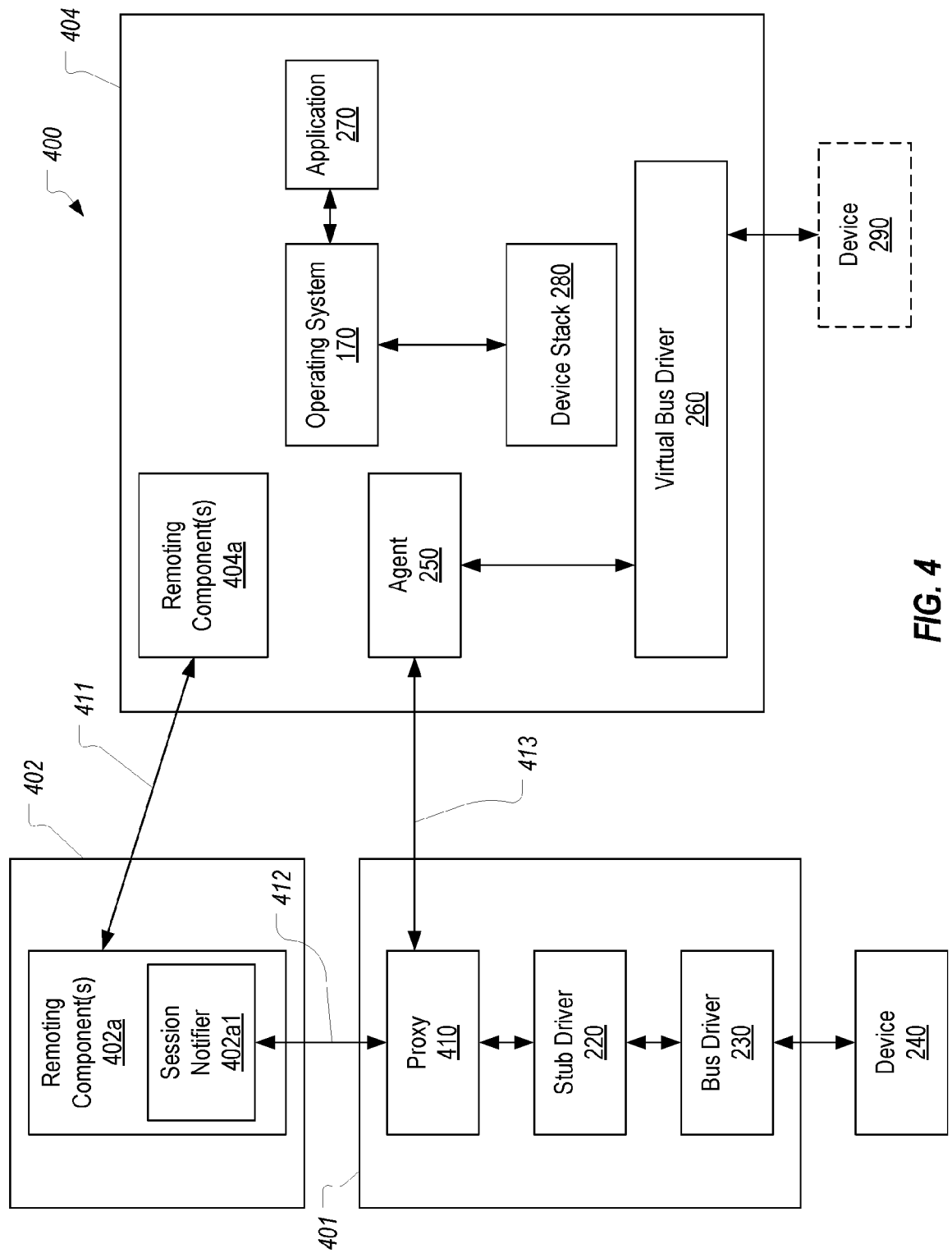
FIG. 4 illustrates an example where a client-side session notifier is employed to notify the auxiliary device when a client terminal creates and terminates a remote session.

FIG. 4 depicts a similar VDI environment 400 that includes a client terminal 402 having remoting component(s) 402a for establishing remote sessions (e.g., remote session 411) with remoting component(s) 404a on server 404. In contrast to VDI environment 300, in VDI environment 400, session notifier 402a1 is located on client terminal 402 as part of remoting component(s) 402a. For example, this client-side session notifier 402a1 could be part of a remoting application that is executed on a thin client's operating system or part of thin client specific firmware.

In a similar manner as described above, session notifier 402a1 can be configured to detect when client terminal 402 has established or terminated a remote session and can notify proxy 410 of auxiliary device 401 accordingly (as represented by arrow 412). In response to such notifications, proxy 410 can commence or terminate the redirection of USB device 240 to server 404 (as indicated by arrow 413) so that USB device 240 will appear as virtual device 290 on server 404 while remote session 411 is established.

Figure 4A:
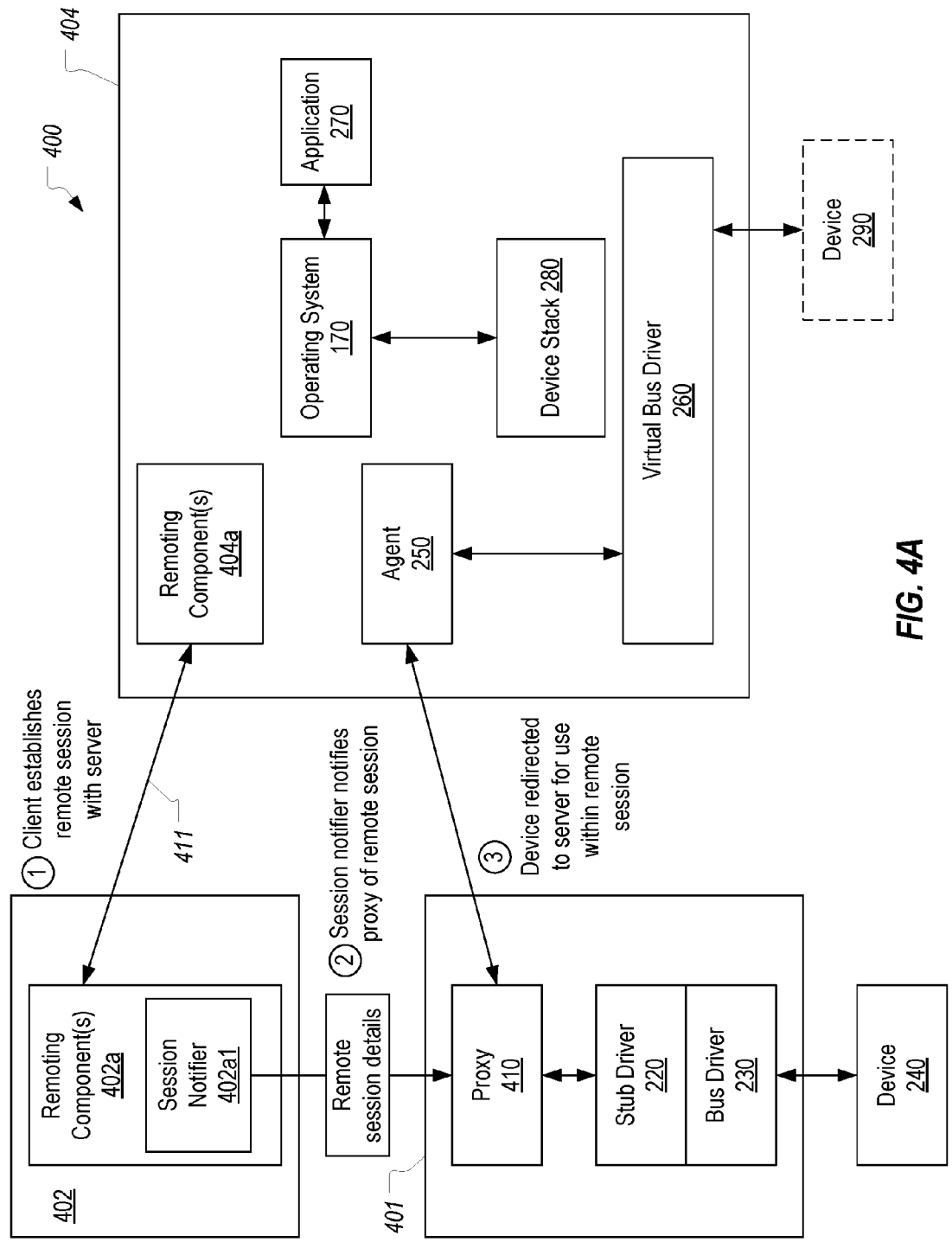
FIGS. 4A and 4B depict an example process by which the client-side session notifier causes the auxiliary device to redirect a USB device and to cease redirecting the USB device respectively.
Figure 4B:
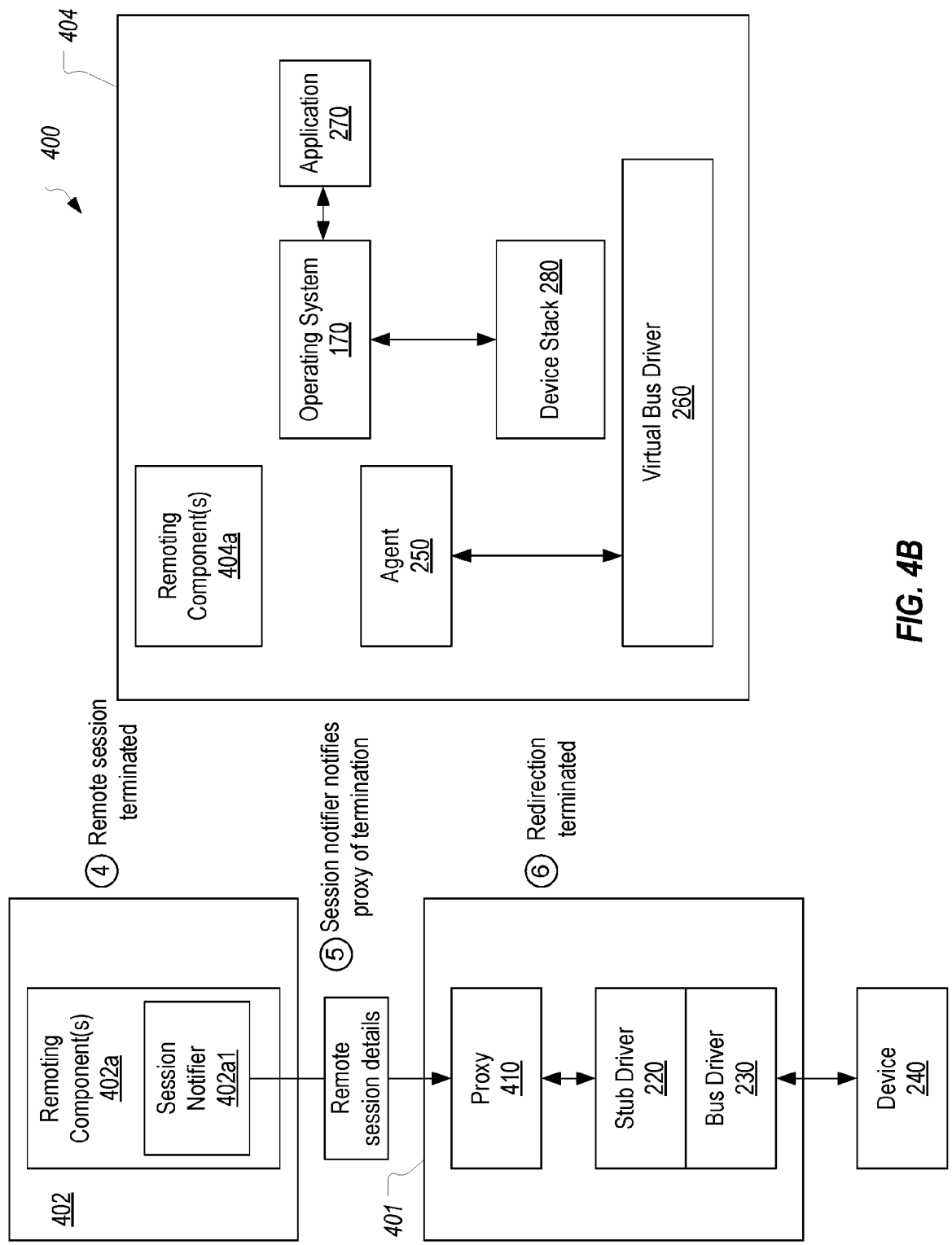

FIGS. 4A and 4B are substantially similar to FIGS. 3A and 3B but represent the process of redirecting USB device 240 when client-side session notifier 402a1 is employed. In step 1, client terminal 402 establishes remote session 411. Session notifier 402a1 can detect when remote session 411 is established and notify proxy 410 accordingly in step 2. For example, session notifier 402a1 can send details of the remote session to proxy 410 to allow proxy 410 to redirect the appropriate USB device in the appropriate manner as will be further described below. In response to the notification, proxy 410 can commence redirecting USB device 240 to server 404 in step 3 so that it appears as virtual device 290 on server 404.

When remote session 411 is terminated in step 4 shown in FIG. 4B, session notifier 402a1 can detect this termination and notify proxy 410 accordingly in step 5. Again, this notification can include appropriate details of the terminated remote session. In response, proxy 410 can terminate the redirection of USB device 240 in step 6. As a result, virtual device 290 will no longer be available on server 404.

As mentioned above, the session notifier is tasked with providing sufficient information to the proxy to allow the proxy to redirect an appropriate USB device to the appropriate server in the appropriate manner. The types of information that the session notifier provides will depend somewhat on the configuration of the VDI environment. For example, to allow the proxy to redirect a USB device to the appropriate server, the session notifier can provide an IP address of the server. Also, if the server is not directly accessible through its IP address, the session notifier can provide a remote gateway IP address to allow the USB device to be redirected via the server's gateway (i.e., via tunneling). The session notifier can also specify the protocol that is used for the remote session between the client terminal and the server so that the USB device can be redirected in accordance with any requirements of the protocol.

To allow the proxy to select the appropriate USB device (s) to redirect, the session notifier can include the client terminal's IP address in notifications. For example, the proxy/auxiliary device may be pre-configured to associate a particular USB device with a particular client terminal or terminals. In such cases, the proxy can employ the client IP address to identify which USB device to redirect. For example, if the user of client terminal 302 desires to redirect a mass storage device to server 304, the mass storage device can be connected to auxiliary device 301. Proxy 310 can then be configured to associate the mass storage device with client terminal 302's IP address so that when a notification that specifies client terminal 302's IP address is received, proxy 310 can identify that the mass storage device (as opposed to other USB devices connected to auxiliary device 301) should be redirected.

To allow the proxy to specify which remote session(s) the redirected USB device should be accessible within, the session notifier can include the session identifier of the remote session in the notifications. For example, when remote session 311 is established, it may be assigned a session identifier such as 2. The session notifier can provide this session identifier in the notification sent to proxy 310. Then, as part of redirecting USB device 240, proxy 310 can specify that the redirected device should only be accessible within remote session 2. Agent 250 (or other suitable components on the server) can then make appropriate configurations to ensure that the redirected device is only accessible within the identified remote session.

Figure 5A:
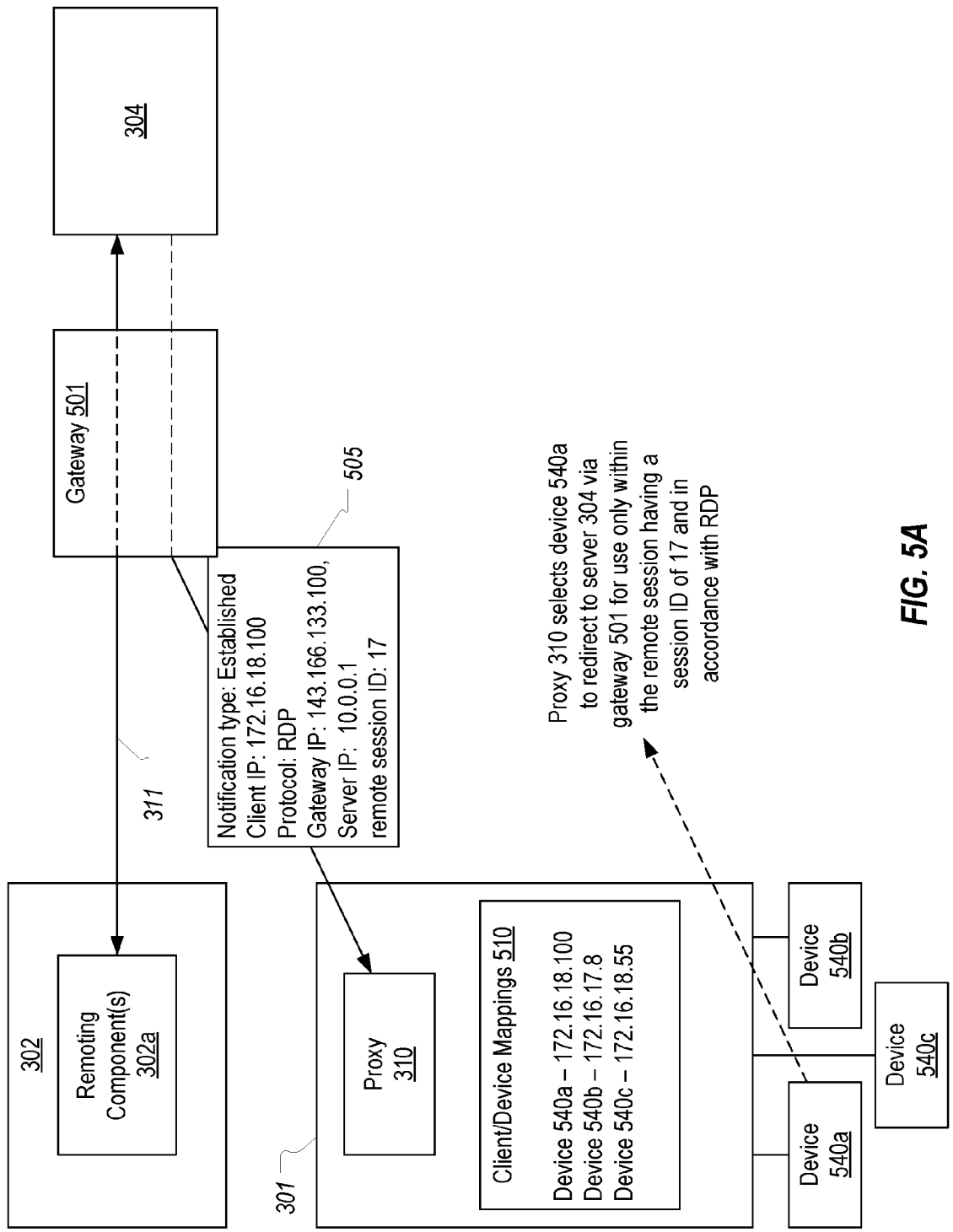
FIGS. 5A and 5B each illustrate an example of how the proxy of the auxiliary device can employ remote session details received from the session notifier to appropriately redirect a USB device.
Figure 5B:
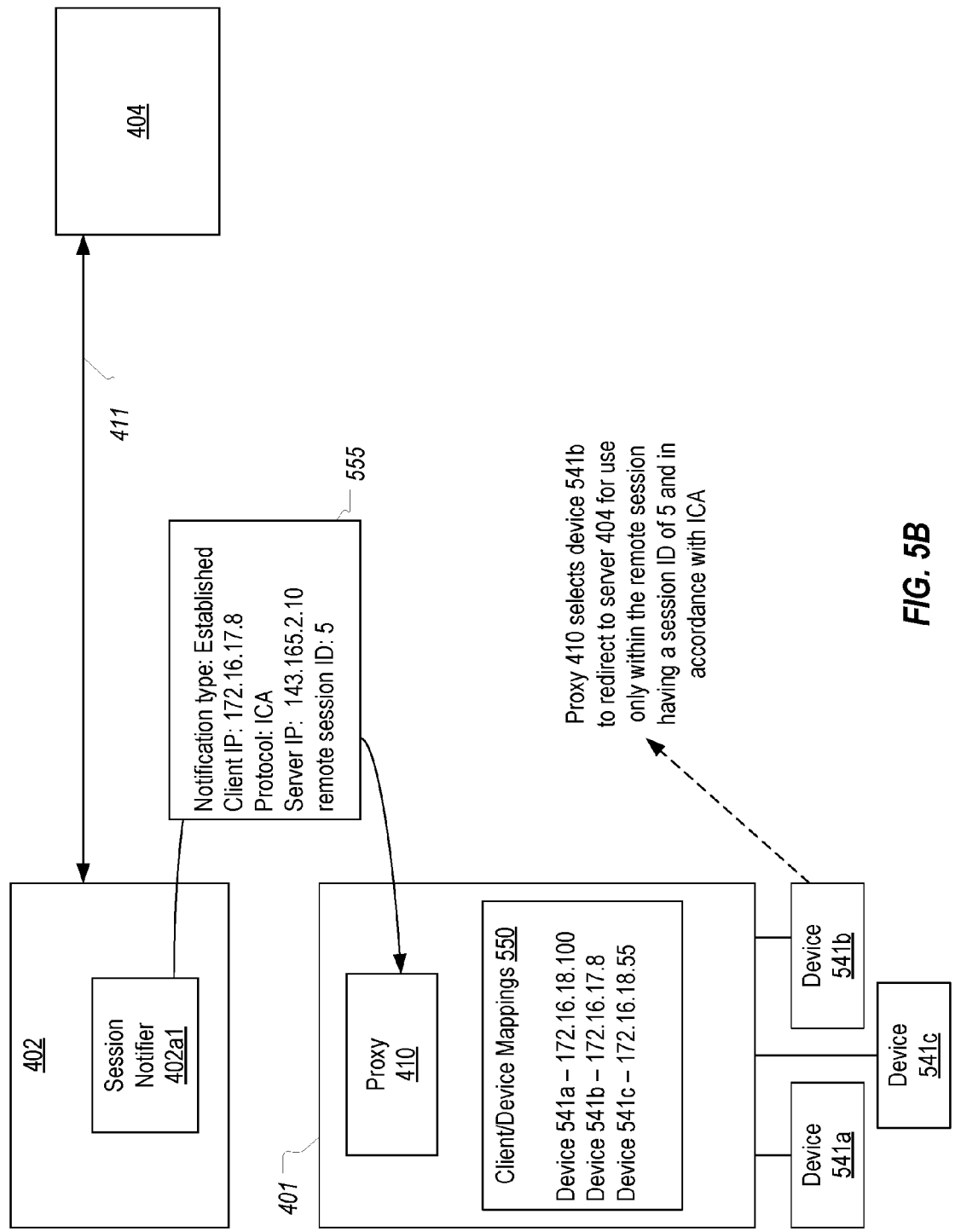

FIGS. 5A and 5B provide specific examples of how the session notifier may include details of a remote session in notifications sent to the proxy. In FIG. 5A, client terminal 302 is shown as establishing remote session 311 with server 304 via gateway 501 and when devices 540a-540c are connected to auxiliary device 301. When remote session 311 is established, server-side session notifier 304a1 can detect the establishment of the remote session and obtain the necessary details of the remote session including the IP address of client terminal 302 (172.16.18.100), the protocol used for remote session 311 (RDP), the IP address of gateway 501 (143.166.133.100), the IP address of server 304 (10.0.0.1), and the session ID of remote session 311 (17). Session notifier 304a1 can then send an "Established" notification 505 to proxy 310 that includes these details. Next, proxy 310 can employ the details to commence redirecting one or more USB devices (e.g., devices 540a-540c) to server 304. In this example, proxy 310 is shown as maintaining client/device mappings 510 which map each connected USB device to one or more client terminal IP addresses. Because notification 505 specifies a client terminal IP address of 172.16.18.100, proxy 310 can access mappings 510 to determine that device 540a should be redirected for use within the remote session to which notification 505 pertains. Using the other details in notification 505, proxy 310 can commence redirecting device 540a to server 304 via gateway 501. As part of this redirection, proxy 310 can specify (e.g., to agent 250) that device 540a should only be accessible within remote session 17 and can be implemented in accordance with RDP. Restricting access to redirected device 540a can be performed in any suitable manner such as by creating a symbolic link to a corresponding virtual device on server 304 only within a namespace pertaining to remote session 17, by blocking access attempts from any process or service that is not executing within session 17, etc.

FIG. 5B illustrates an example where client terminal 402 establishes a remote session 411 with server 404 directly (i.e., not via a gateway) and when devices 541a-541c are connected to auxiliary device 401. In response, client-side session notifier 402a1 can detect the establishment of remote session 411 and obtain the necessary details about the remote session. For example, session notifier 402a1 can identify client terminal 402's IP address (172.16.17.8), a protocol used to establish remote session 411 (ICA), the IP address of server 404 (143.165.2.10), and the session ID of remote session 411 (5). Session notifier 402a1 can include these details within "Established" notification 555. In response to receiving notification 555, proxy 410 can employ the specified client IP address to determine that device 541b should be redirected. Proxy 410 may also employ the remaining details to redirect device 541b to server 404 for access from within the remote session having a session ID of 5 and in accordance with the ICA protocol.

With each of these examples, the session notifier can also be configured to send a corresponding "Terminated" notification which provides sufficient information to allow the proxy to terminate the redirection of the corresponding USB device. For example, with reference to FIG. 5A, session notifier 404a1 can send a "Terminated" notification that includes the client IP address and/or the remote session ID thereby allowing proxy 410 to identify that the redirection of device 540a should be terminated.

In contrast to what is shown in FIGS. 5A and 5B, in some embodiments, rather than having a pre-configured association between a USB device and a client terminal, the notification sent to the proxy can include an identifier (or selection) of one or more USB devices to be redirected. For example, notification 505 may include an identifier of USB device 540a. In such cases, the inclusion of an identifier of a particular USB device in the notification may be based on a user's selection of the USB device in conjunction with or after establishing a remote session. For example, after remote session 311 is established, the user of client terminal 302 may provide input requesting that USB device 540a be made accessible within remote session 311. In response, session notifier 304a1 may provide notification 505 containing the appropriate details, including an identifier of USB device 540a, to allow proxy 310 to commence the redirection. Accordingly, in some embodiments, the session notifier may provide a notification in response to a request to redirect a USB device for use within an established remote session rather than in response to the establishment of a remote session. In other words, in some embodiments, a USB device may not be automatically redirected whenever an associated client terminal establishes a remote session, but will be redirected on demand. In some embodiments, even when the notification includes an identifier of a USB device to be redirected, the auxiliary device may still maintain mappings/associations which define whether a particular USB device can be redirected for access within a particular client terminals' remote session. In this way, a client terminal can be prevented from redirecting a USB device to which it should not have access.

It is noted that, in some embodiments, the proxy on the auxiliary device may associate a USB device with more than one client terminal. For example, with reference to FIG. 5B, mappings 550 may indicate that device 541a is associated with five different client IP addresses. This would allow the same USB device to be redirected for use on the server whenever any of the identified client terminals establish a remote session. For example, if device 541a is a printer, it may be desired to allow the printer to be accessed from within remote sessions established by all users located in proximity to the printer. Mappings 550 can be employed to facilitate this. For example, if the printer is already being redirected to server 404 when another client terminal which is authorized to access the printer establishes a remote session with server 404, proxy 410 can provide information to agent 250 so that appropriate configurations are made on server 404 to ensure that the printer will also be accessible within the additional remote session. As an example, proxy 410 could provide the session ID of the newly established remote session to agent 250 which in turn could update settings on server 404 to allow the printer to be accessed within the newly established remote session.

Accordingly, when the proxy receives an "Established" notification, it can either commence redirecting a USB device or, if the corresponding USB device is already being redirected, provide appropriate information (e.g., the session ID of the newly established remote session) to ensure that the redirected device will be accessible within the newly established remote session. Similarly, when the proxy receives a "Terminated" notification, it can either terminate the redirection of the USB device or, if the device is associated with any other remote sessions that are still established, continue to redirect the device until all associated remote sessions have been terminated. In such cases, the proxy may also provide appropriate information (e.g., the session ID of the terminated remote session) so that the redirected USB device will not remain accessible within a remote session that may subsequently be assigned the same session ID as the now terminated remote session.

In typical embodiments, the auxiliary device can be located in close proximity to the client terminals that are associated with the USB devices that may be redirected. For example, if the client terminal includes a USB port but is not configured with redirection components, the auxiliary device may even be plugged into the client terminal (e.g., similar to a USB hub) but include its own network connection for interfacing with the client terminal and server (e.g., the auxiliary device would have its own NIC). This would allow a user to connect USB devices to the auxiliary device as if they were being connected to his or her client terminal. Alternatively, the auxiliary device may be a stand-alone component (e.g., a separate client terminal that is capable of redirecting USB devices) that is located near a client terminal or that is isolated from user access (e.g., locked in a secure room).

FIG. 6 provides a flowchart of an example method 600 for employing an auxiliary device to implement USB device redirection. As an example, method 600 can be implemented by auxiliary device 301 or auxiliary device 401 and will be described with primary reference to FIGS. 5A and 5B.

Method 600 includes an act 601 of receiving, at a proxy of the auxiliary device, a first notification that includes information about a first remote session that has been established between a first client terminal and a server. For example, proxy 310 or proxy 410 can receive notification 505 or notification 555 respectively.

Method 600 includes an act 602 of processing the information in the first notification to identify a USB device to be redirected to the server for access within the first remote session, the USB device being coupled to the auxiliary device. For example, proxy 310 or proxy 410 could process the information in notification 505 or notification 555 to determine that USB device 540a or USB device 541b should be redirected to server 304 or server 404 for access within remote session 311 or remote session 411 respectively.

Method 600 includes an act 603 of commencing the redirection of the USB device to the server to allow the client terminal to access the USB device from within the first remote session. For example, proxy 310 or proxy 410 could commence redirecting USB device 540a or USB device 541b to server 304 or server 404 respectively.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed in a virtual desktop infrastructure ("VDI") environment, for employing an auxiliary device to implement USB device redirection, the method comprising:

receiving, at a proxy of the auxiliary device, a first notification that includes information about a first remote session that has been established between a first client terminal and a server, the auxiliary device, the first client terminal and the server being distinct computing devices, the first notification being received in conjunction with the establishment of the first remote session between the first client terminal and the server, the first notification being received from a session notifier that executes on either the first client terminal or the server;

processing the information in the first notification to identify a USB device to be redirected to the server for access within the first remote session established between the first client terminal and the server, the USB device being coupled to the auxiliary device but not coupled to the first client terminal; and commencing the redirection of the USB device from the auxiliary device to the server to allow the first client terminal to access the USB device from within the first remote session such that the USB device is accessible within the first remote session established between the first client terminal and the server even though the USB device is coupled to the auxiliary device that is a distinct computing device from the first client terminal and the server.

2. The method of claim 1, wherein the session notifier executes on the first client terminal.

3. The method of claim 1, wherein the session notifier executes on the server.

4. The method of claim 1, wherein the first notification includes one or more of:
   an IP address of the first client terminal;
   an IP address of the server;
   an IP address of a gateway;
   a protocol employed to establish the first remote session; or
   a session ID of the first remote session.

5. The method of claim 4, wherein processing the information in the first notification to identify a USB device to be redirected to the server for access within the first remote session comprises determining that the IP address of the first client terminal is associated with the USB device.

6. The method of claim 4, wherein commencing the redirection of the USB device to the server comprises employing the IP address of server and/or the IP address of the gateway to redirect the USB device to the server.

7. The method of claim 4, wherein commencing the redirection of the USB device to the server comprises sending the session ID of the first remote session to the server to allow the server to restrict access to the USB device based on the session ID.

8. The method of claim 7, wherein restricting access to the USB device comprises allowing the USB device to be accessed only within the first remote session.

9. The method of claim 4, wherein the USB device is redirected using the protocol specified in the first notification.

10. The method of claim 1, wherein the first notification is received in response to the first remote session being established or in response to a request to redirect the USB device after the first remote session has been established.

11. The method of claim 1, further comprising:
receiving, at the proxy, a second notification that indicates that the first remote session has been terminated, the second notification being received from the session notifier that executes on either the first client terminal or the server; and
ceasing the redirection of the USB device.

12. The method of claim 1, further comprising:
receiving, at the proxy, a second notification that includes information about a second remote session that has been established between a second client terminal and the server, the second notification being received from a session notifier that executes on either the second client terminal or the server;
processing the information in the second notification to identify that the USB device is to be redirected to the server for access within the second remote session;
determining that the USB device is already being redirected to the server; and
sending information to the server indicating that the USB device should be accessible from within the second remote session.

13. The method of claim 12, further comprising:
receiving, at the proxy, a third notification that indicates that the second remote session has been terminated, the third notification being received from the session notifier that executes on either the second client terminal or the server;
determining that the USB device is being redirected for access within the first remote session; and
continuing to redirect the USB device to the server.

14. The method of claim 13, further comprising:
sending a session ID of the second remote session to the server to allow the server to prevent the USB device from being accessed from within a remote session that is assigned the session ID.

15. A virtual desktop infrastructure ("VDI") environment comprising:
a server;
a client terminal that is configured to establish remote sessions with the server; and
an auxiliary device to which one or more USB devices are connected and that is configured to redirect the one or more USB devices to the server for access by the client terminal from within a remote session established between the client terminal and the server,
wherein either the server or the client terminal includes a session notifier that sends a first notification to a proxy on the auxiliary device when a remote session is established between the client terminal and the server and sends a second notification to the proxy when the remote session is terminated; and
wherein the proxy is configured to employ information contained in the first notification to identify at least one of the one or more USB devices to redirect to the server, the proxy also being configured to employ the information contained in the first notification to establish a connection with the server over which the at least one of the one or more USB devices is redirected, the proxy further being configured to employ information contained in the second notification to cease redirecting the at least one of the one or more USB devices.

16. The VDI environment of claim 15, wherein the first notification includes one or more of:
an IP address of the client terminal;
an IP address of the server;
an IP address of a gateway;
a protocol employed to establish the remote session; or
a session ID of the remote session.

17. The VDI environment of claim 16, wherein employing information contained in the first notification to identify at least one of the one or more USB devices to redirect to the server comprises determining that the IP address of the client terminal is associated with the at least one of the one or more USB devices.

18. One or more computer storage media storing computer executable instructions which when executed in a virtual desktop infrastructure ("VDI") environment implement a method for employing an auxiliary device to implement USB device redirection, the method comprising:
detecting, by a session notifier executing on either a server or a client terminal, that a remote session has been established between the server and the client terminal;
obtaining, by the session notifier, information about the remote session;
sending, by the session notifier, a notification to a proxy on the auxiliary device, the notification including the information about the remote session, wherein the auxiliary device, the client terminal and the server are distinct computing devices;
processing, by the proxy, the information included in the notification to identify one or more USB devices that are to be redirected to the server for access within the remote session established between the server and the client terminal; and
employing, by the proxy, the information included in the notification to commence redirecting the one or more USB devices to the server such that the one or more USB devices are accessible within the remote session established between the server and the client terminal even though the one or more USB devices are coupled to the auxiliary device that is a distinct computing device from the client terminal and the server.

19. The computer storage media of claim 18, wherein the information included in the notification comprises one or more of:
an IP address of the client terminal;
an IP address of the server;
an IP address of a gateway;
a protocol employed to establish the remote session;
a session ID of the remote session; or
an identifier of each of the one or more USB devices.

20. The computer storage media of claim 18, wherein the method further comprises:
detecting, by the session notifier, that the remote session has been terminated;
sending, by the session notifier, a second notification to the proxy, the second notification indicating that the remote session has been terminated; and
in response to receiving the second notification, ceasing, by the proxy, the redirection of the one or more USB devices.

* * * * *